J. G. G. EKLUNDH, C. ODEN AND J. A. SCHMITT.
MILKING MACHINE.
APPLICATION FILED MAR. 5, 1918.

1,337,211. Patented Apr. 20, 1920.

Witness
A. Lundell

Inventors
John G. G. Eklundh
Clyde Oden
John A. Schmitt
By
C. C. Shepherd, Attorney

UNITED STATES PATENT OFFICE.

JOHN G. G. EKLUNDH, CLYDE ODEN, AND JOHN A. SCHMITT, OF COLUMBUS, OHIO, ASSIGNORS TO THE UNIVERSAL MILKING MACHINE COMPANY, OF COLUMBUS, OHIO, A CORPORATION OF OHIO.

MILKING-MACHINE.

1,337,211.  Specification of Letters Patent.  Patented Apr. 20, 1920.

Application filed March 5, 1918. Serial No. 220,429.

*To all whom it may concern:*

Be it known that we, JOHN G. G. EKLUNDH, subject of the King of Sweden, and CLYDE ODEN and JOHN A. SCHMITT, citizens of the United States, residing at Columbus, in the county of Franklin and State of Ohio, have invented certain new and useful Improvements in Milking-Machines, of which the following is a specification.

This invention relates to milking machines, and has for its object to provide an improved form of teat cup for use in connection with such machines, wherein is embodied improved features of construction for increasing the efficiency and durability of said cup.

A main object of the invention is to provide a teat cup including a pneumatically pulsated flexible lining, and to provide in conjunction with said lining improved means for constantly maintaining the same in a relatively taut condition and free from looseness or slack, such as would tend to interfere with its pulsating movements and its consequent efficient operation.

Other objects will be in part obvious and in part pointed out hereinafter.

The invention accordingly consists in the novel features of construction, combination of elements, and arrangement of parts hereinafter fully described and set forth with particularity in the claim hereunto appended.

In the drawing, wherein has been shown the preferred embodiment of the invention:

Similar characters of reference denote corresponding parts throughout the several views of the drawing.

Figure 1:
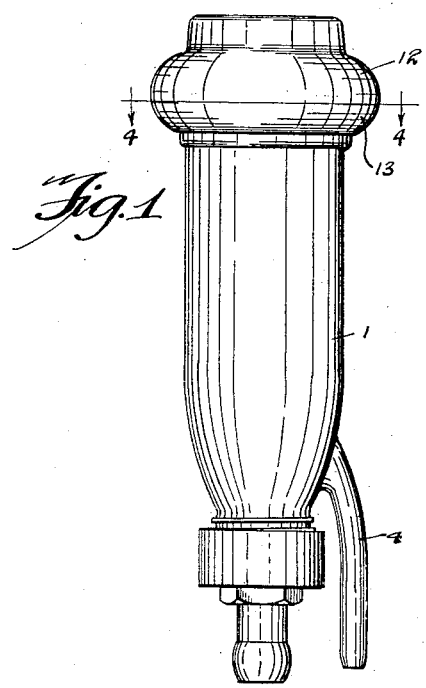
Figure 1 is a side elevation of the cup comprising the present invention.

Referring more particularly to the drawing, the invention in its preferred form comprises a teat cup A of the type particularly employed in conjunction with suction operated milking units. This cup consists of an outer metallic casing 1 of substantially tubular formation, and including an inwardly curved or reduced lower half which terminates in a substantially straight, exteriorly threaded lower extremity 2. Integrally formed with the casing and provided with a bore 3, communicating with the interior thereof, is a nozzle 4 which is adapted to be connected with means (not shown) for alternately creating and destroying a vacuum within said casing. Situated within the latter is a downwardly converging or tapering soft, flexible lining 5, formed of rubber or other similar material, which has its lower extremity turned outwardly to provide a collar 6, the latter being disposed to engage with the lower edge of the extremity 2. A nipple 7 is threaded upon the extremity 2 and is formed with a shoulder 8, which is adapted to be brought into frictional engagement with the collar 6, in order that the latter may be firmly secured to the lower end of said casing. The nipple is formed with a central passageway 9, situated in communication with the interior of the tubular and tapering lining 5, said nipple being adapted to have connected therewith a hose or the like (not shown) leading to a suitable pump, whereby when the pump is in operation, a continuous suction is maintained within said lining. Thus by virtue of the alternating suction upon the exterior of said lining and the continuous suction within the same, the lining will be given a pulsating movement, which is highly desirable in effecting the operating of milking a cow.

In order to distinctly point out the features of the cup A to which this invention is directed, it is thought advisable to state at this juncture that the construction so far described does not directly form the specific subject matter of the invention, as the latter deals more particularly with an improved method of securing the upper end of the lining 5 to the casing 1. Hitherto, it has been the common practice to secure the upper end 10 of said lining to the casing by means of a threaded metallic cap, which was adapted to impinge against a collar formed on the upper end of the lining, in a manner similar to that disclosed for securing the lower end of said lining. However, owing to the pulsating movements of the lining, or to the chemical action of the animal fats thereon, the latter would in course of time stretch to such extent as to become loose or flabby within the casing, and would consequently result in mitigating the action or effects of the pump pulsations thereon. This as will be obvious, resulted in decreasing the efficiency of the cup and thus necessitated the replacing of the used lining with a new one.

To overcome this objection, the present invention provides means whereby the slack which appears in the lining may be readily and conveniently taken up, so that said lining will be constantly maintained in a relatively taut condition best calculated to efficiently respond to pump pulsations.

Figure 2:
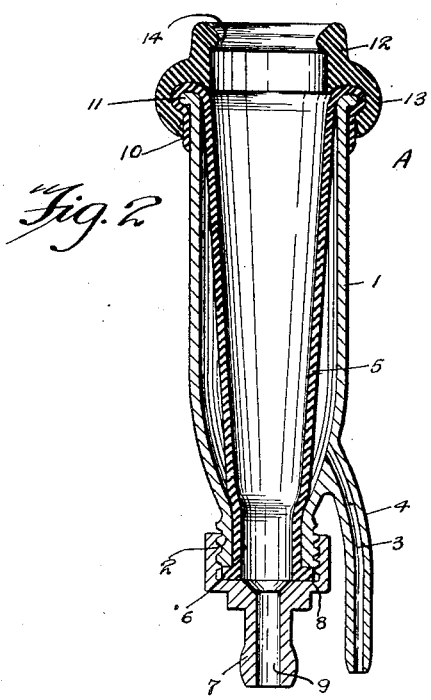
Fig. 2 is a vertical sectional view thereof.
Figure 3:
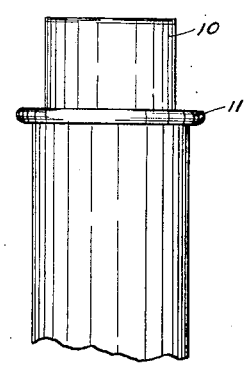
Fig. 3 is a fragmentary elevation of the cup showing the lining thereof in position to be drawn over the sides of the cup casing.
Figure 4:
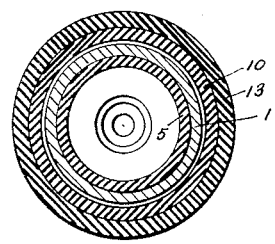
Fig. 4 is a horizontal sectional view taken along the line 4—4 of Fig. 1.

To this end, the upper extremity 10 of the casing is extended, as shown in Fig. 3, an appreciable distance beyond the upper end of the casing, and this end 10 is adapted to be drawn upwardly so that the body of the lining will be slightly flexed or drawn taut. When the lining assumes this condition, the end 10 thereof is drawn back so as to overlie the upper end of said casing, and to extend downwardly and parallel with the exterior of the latter, as shown by Fig. 2. To secure the upper end of the lining in this drawn position, the casing is provided at its upper end with an integral flange 11 over which the lining is passed, and adapted to grip the lining and to retain the same in locking engagement with the flange 11 and the upper end of the casing is a rubber cap 12. This cap is formed with a curved resilient collar portion 13, which is shaped to follow the curvature of the end 10 so as to firmly embrace the same and to prevent its slipping from its adjusted position.

In operation, when the lining becomes loose within the casing 1, so as not to quickly respond to the action of the pump fluctuations, the cap 12 is removed from engagement with the lining and flange 11 by simply forcing the same upwardly. This permits the end 10 of said lining to be adjusted to the position shown in Fig. 3, whereby it may be conveniently gripped. Then by pulling or stretching the lining in upward direction, the same will be drawn taut and, obvious, the slack therein removed. It will, of course, be appreciated that the lower end of the lining is firmly held by the action of the nipple 7, so that the drawing or flexing of the lining may be readily accomplished. After said lining has been drawn in the manner above stated, the same is bent or twisted so as to overlap the flange 11 and to surround the upper end of the casing 1. This action has the effect of stretching the end of the lining, so that the latter will be held in its adjusted position. To further insure the non-slipping of the lining from its adjusted position, use is made of the rubber cap 12, which is drawn over the lining in the manner shown in Fig. 2 so as to firmly embrace the same, and owing to the inherent resiliency of said cap, the lining will be firmly and positively held in position.

Thus it will be manifest that the present invention provides convenient and efficient means for readily and securely maintaining the flexible lining of the cup in its requisite taut condition, and further provides means whereby the lining may be quickly and easily adjusted to overcome stated objections. Through use of the construction set forth, the life of the lining 5 is greatly increased so that the invention materially contributes in lowering the maintenance cost of a milking outfit and at the same time serves to increase its efficiency. The use of the rubber cap 12 is in itself an improvement over the old form of metal cap, as it eliminates the cold touch of the latter and renders the animal less sensitive to the use of the cup. It will be noted that the elements shown for connecting the lining within the casing are so closely related as to avoid the presence of objectionable crevices or small openings, such as would be likely to collect bacteria, thus insuring the sanitary condition of the cup and to permit the latter to be thoroughly cleansed. An annular bead 14 is formed integrally with the cap 12 and serves to increase the effect of a suction within the lining 5 by preventing the admittance of extraneous air.

Having described the invention, what is claimed as new and patentable is:

A teat cup comprising a substantially tubular casing, a flexible lining disposed within said casing and spaced from the inner wall of the latter so as to define an interposed suction chamber therebetween, the upper portion of said lining being lapped over the upper peripheral edge of said casing to encircle the outer portion of said edge, and a cap member resiliently formed to frictionally engage the overlapped portions of said lining to unite the latter to said casing, the bore of said cap member and the interior wall of said lining being disposed in continuing vertical registration or alinement whereby a teat receiving passage is provided free of matter-collecting crevices.

In testimony whereof we affix our signatures.

JOHN G. G. EKLUNDH.
CLYDE ODEN.
JOHN A. SCHMITT.